United States Patent
Buzdum et al.

(10) Patent No.: US 7,674,078 B1
(45) Date of Patent: Mar. 9, 2010

(54) HOLE SAW HAVING EFFICIENT SLUG REMOVAL

(76) Inventors: Mirko Buzdum, W4116 County Rd. MM, Watertown, WI (US) 53098; Richard E. Capstran, 1840 N. Prospect Ave., #516, Milwaukee, WI (US) 53213

( * ) Notice: Subject to any disclaimer, the term of this patent is extended or adjusted under 35 U.S.C. 154(b) by 0 days.

(21) Appl. No.: 11/495,475

(22) Filed: Jul. 28, 2006

(51) Int. Cl.
*B23B 51/04* (2006.01)

(52) U.S. Cl. .................. 408/1 R; 408/204; 408/206

(58) Field of Classification Search ............ 408/1 R, 408/204, 207, 209, 211, 68, 703, 205, 206, 408/212, 213, 224, 225; *B23B 51/04, 51/05*
See application file for complete search history.

(56) References Cited

U.S. PATENT DOCUMENTS

| | | | | |
|---|---|---|---|---|
| 2,053,702 A * | 9/1936 | Davis | 408/125 |
| 2,444,099 A * | 6/1948 | Hennessey, Jr. | 408/206 |
| 2,543,206 A * | 2/1951 | Smith | 408/224 |
| 2,613,710 A * | 10/1952 | Emmons | 408/213 |
| 2,779,361 A * | 1/1957 | McKiff | 408/204 |
| 2,782,824 A * | 2/1957 | Robinson | 408/223 |
| 2,812,791 A * | 11/1957 | Mackey | 408/212 |
| 3,265,104 A | 8/1966 | Gallo, Sr. | 145/130 |
| 3,390,596 A * | 7/1968 | Trevathan | 408/68 |
| 3,456,747 A * | 7/1969 | Elwell et al. | 175/403 |
| 3,920,350 A * | 11/1975 | Southall | 408/211 |
| 4,076,444 A * | 2/1978 | Siebrecht | 408/226 |
| 4,148,593 A * | 4/1979 | Clark | 408/204 |
| 4,199,060 A * | 4/1980 | Howard | 206/231 |
| 4,275,796 A * | 6/1981 | Kleine | 175/385 |
| 4,286,904 A * | 9/1981 | Porter et al. | 408/225 |
| 4,303,357 A * | 12/1981 | Makar | 408/204 |
| 4,406,334 A * | 9/1983 | Baumann et al. | 175/315 |
| 4,652,185 A * | 3/1987 | Malrick | 408/68 |
| 4,669,928 A * | 6/1987 | Mediavilla | 408/68 |
| 5,433,561 A * | 7/1995 | Schimke | 408/211 |
| 5,934,845 A | 8/1999 | Frey | 408/68 |
| 6,048,141 A * | 4/2000 | Freeman | 408/201 |
| 6,206,616 B1 * | 3/2001 | Smith et al. | 408/1 R |
| 6,599,063 B1 * | 7/2003 | Capstran | 408/1 R |
| 7,001,116 B2 * | 2/2006 | Kozak | 408/68 |
| 7,073,992 B2 * | 7/2006 | Korb et al. | 408/204 |

(Continued)

FOREIGN PATENT DOCUMENTS

EP            870561 A1 * 10/1998

(Continued)

*Primary Examiner*—Daniel W Howell
(74) *Attorney, Agent, or Firm*—Donald J. Ersler

(57) ABSTRACT

A hole saw having efficient slug removal includes a saw cup, a shank portion, a spade bit, a compression spring and a contact disc. A plurality of cutting teeth are formed on an open end of the saw cup and the shank portion is attached to the other end of the saw cup with any suitable fastening process. The spade bit includes a cutting bit and a shank. A shank opening is formed through the shank portion to receive the shank of the spade bit. Preferably, a set screw or the like is used to retain the spade bit in the shank opening. The shank of the spade bit is inserted through the contact disc and then the compression spring, before insertion into the shank opening. A hole slug is ejected from the saw cup, when the hole saw is removed from a hole.

18 Claims, 1 Drawing Sheet

U.S. PATENT DOCUMENTS

| | | | | |
|---|---|---|---|---|
| 7,140,814 B2 * | 11/2006 | Singh et al. | ............... | 408/211 |
| 7,160,064 B2 * | 1/2007 | Jasso | ....................... | 408/68 |
| 2004/0042861 A1 * | 3/2004 | Capstran | .................. | 409/132 |
| 2007/0212179 A1 * | 9/2007 | Khangar et al. | ............ | 408/204 |

FOREIGN PATENT DOCUMENTS

| | | | |
|---|---|---|---|
| FR | 2617753 A1 * | 1/1989 |
| GB | 1589293 A * | 5/1981 |
| GB | 2225262 A * | 5/1990 |
| JP | 2003145330 A * | 5/2003 |
| WO | WO 2004011179 A1 * | 2/2004 |

* cited by examiner

HOLE SAW HAVING EFFICIENT SLUG REMOVAL

BACKGROUND OF THE INVENTION

1. Field of the Invention

The present invention relates generally to hole saws and more specifically to a hole saw having efficient slug removal, which allows a slug to be removed from the hole saw without the use of additional tools.

2. Discussion of the Prior Art

The most common type of hole saw is a cup with teeth formed on the open end, a shank attached to the other end of the cup, and a drill retained in the shank. The drill starts the hole cutting process by providing a pivotal anchor for cutting the hole with the cup. However, an aggravating problem encountered with hole saws is the removal of a hole slug from the cup. Depending upon the material of the hole slug, removal of the slug can be a major challenge. If the material is plastic, the plastic hole slug will heat bond to the inside surface of the cup. There are numerous solutions proposed for removal of the hole slug. The simplest method of slug removal is to form openings in the top and/or side of the hole saw to allow the slug to be pushed or pried out with a tool.

U.S. Pat. No. 3,265,104 to Gallo, Sr. discloses a tubular saw cutter with chip removal means. A third embodiment of the Gallo, Sr. patent includes a rotary saw holder in which the center guiding means is a wood drill bit or the like surrounded by a spring and in communication with a double disc. The spring and the double disc act to dislodge a hole slug from inside the rotary saw holder. U.S. Pat. No. 5,934,845 to Frey discloses a hole saw with modified pilot and plug biasing. The Frey patent includes a mandrel having a central pilot drill bit having a tapered shank to facilitate removal of the plug from an annular cutting saw blade. A helical spring is preferred coaxially mounted between the saw blade and the pilot. The spring biases the plug as the hole is being cut and automatically ejects the plug from the saw.

Accordingly, there is a clearly felt need in the art for a hole saw having efficient slug removal, which utilizes a spade bit instead of a location drill and allows a hole slug to be removed from the hole saw without the use of tools.

SUMMARY OF THE INVENTION

The present invention provides a hole saw having efficient slug removal that allows a hole slug to removed therefrom without the use of tools. The hole saw having efficient slug removal preferably includes a saw cup, a shank portion, a spade bit, a compression spring and a contact disc. A plurality of cutting teeth are formed on an open end of the saw, cup and the shank portion is attached to the other end of the saw cup with any suitable fastening process. The spade bit includes a cutting bit and a shank. A shank opening is formed through the shank portion to receive the shank of the spade bit. Preferably, a threaded fastener, such as a set screw is used to retain the spade bit in the shank opening. The shank of the spade bit is inserted through the contact disc and then the compression spring, before insertion into the shank opening. The compression spring biases the contact disc to push against a hole slug from a hole being cut in a piece of material and automatically ejects the hole slug from the saw cup.

Accordingly, it is an object of the present invention to provide a hole saw having efficient slug removal that reduces the size of the slug.

It is a further object of the present invention to provide a hole saw having efficient slug removal that includes a spade bit, which allows the reduced slug to fall out of the hole saw.

Finally, it is another object of the present invention to provide a hole saw having efficient slug removal that includes a compression spring and contact disc that eject a hole slug from the saw cup.

These and additional objects, advantages, features and benefits of the present invention will become apparent from the following specification.

DETAILED DESCRIPTION OF THE PREFERRED EMBODIMENTS

Figure 1:
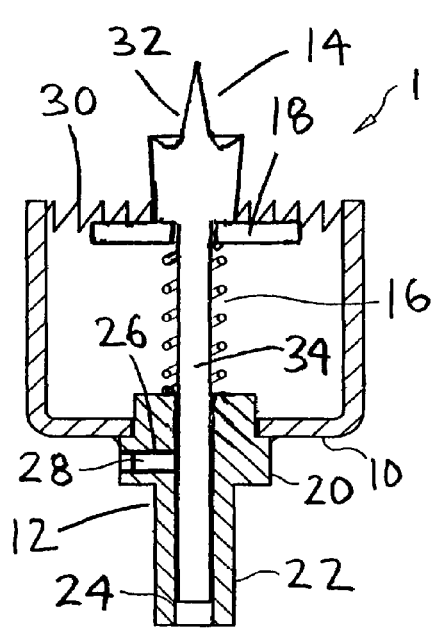
FIG. 1 is a cross sectional view of a hole saw having efficient slug removal in accordance with the present invention.
Figure 2:
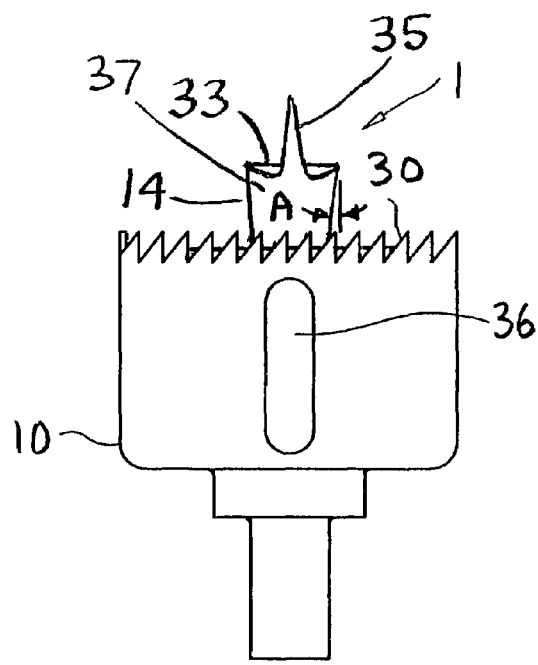
FIG. 2 is a side view of a hole saw having efficient slug removal with at least one removal slot in accordance with the present invention.
Figure 3:
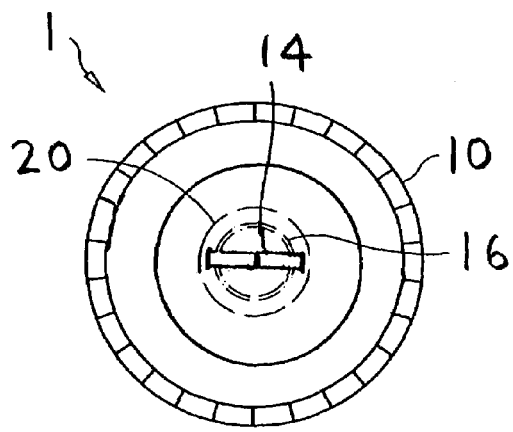
FIG. 3 is a top view of a hole saw having efficient slug removal in accordance with the present invention.

With reference now to the drawings, and particularly to FIG. 1, there is shown a cross sectional view of a hole saw having efficient slug removal 1. With reference to FIGS. 2-3, the hole saw having efficient slug removal 1 preferably includes a saw cup 10, a shank portion 12, a spade bit 14, a compression spring 16 and a contact disc 18. A plurality of cutting teeth 30 are formed on an open end of the saw cup 10. However, other types of cutting surfaces may be formed on the open end of the saw cup 10, such as an abrasive cutting surface.

The shank portion 12 is attached to a closed end of the saw cup 10 with any suitable fastening process, such as welding. The shank portion 12 preferably includes a fastening portion 20 and a chuck shank 22. A shank opening 24 is formed through the fastening portion 20 and the chuck shank 22 to receive the spade bit 14. A female thread 26 is preferably formed through the fastening portion 22 to the shank opening 24. A threaded fastener 28 (such as a set screw) is preferably tightened against the spade bit 14 to retain thereof relative to the saw cup 10. However, other designs of shank portions may also be used.

The spade bit 14 includes a cutting bit 32, and a shank 34. The cutting bit 32 includes at least one substantially horizontal cutting surface 33 and a vertical tapered cutting projection 35. A base portion 37 of the cutting bit 32 is preferably negatively tapered by angle "A" on opposing sides to provide a cutting relief. Angle "A" has a preferable value of between 1-4 degrees, but other angular values may also be used. The vertical tapered cutting projection 35 extends from the base portion 37. It has been found that the use of a Speedbor spade bit from Irwin Industrial Tools produces satisfactory results.

The shank 34 of the spade bit 14 is inserted through the contact disc 18 and then the compression spring 16, before insertion into the shank opening 24. The compression spring 16 biases the contact disc 18 to push against a plug from a hole (not shown) being cut in a piece of material and automatically ejects the plug from the saw cup 10. U.S. Pat. No. 5,934,845 is hereby incorporated by reference to illustrate a plug being cut from a piece of material and being pushed out of a saw cup 110 in FIGS. 7-8. At least one removal slot 36 may be formed in a side and/or in a closed end of the saw cup 10 to provide clearance for a tool (such as a screw driver), which would be used to help remove a slug from the saw cup 10, if the need should arise. Removal openings having other shapes in the side and open end of the saw cup 10 may also be used.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A method of providing efficient slug removal from a hole saw comprising the steps of:
    providing a saw cup having a cutting surface formed on an open end thereof;
    forming a shank portion on a closed end of said saw cup; and
    retaining a shank of a spade bit in said shank portion, at least one substantially horizontal cutting surface being formed on a base portion of said spade bit, said at least one substantially horizontal cutting surface extending out-of said saw cup and past said cutting surface.

2. The method of providing efficient slug removal from a hole saw of claim 1, further comprising the step of:
    providing a plurality of cutting teeth for said cutting surface.

3. The method of providing efficient slug removal from a hole saw of claim 1, further comprising the step of:
    threading a fastener into said shank portion to retain said spade bit.

4. The method of providing efficient slug removal from a hole saw of claim 1, further comprising the step of:
    inserting said shank into a contact disc and a compression spring before inserting said shank into said shank portion.

5. The method of providing efficient slug removal from a hole saw of claim 1, further comprising the step of:
    providing said spade bit with a vertical tapered cutting projection extending from said base portion.

6. The method of providing efficient slug removal from a hole saw of claim 1, further comprising the step of:
    providing said spade bit with a base portion, forming a negative tapered surface on opposing sides of said base portion.

7. A method of providing efficient slug removal from a hole saw comprising the steps of:
    providing a saw cup having a cutting surface formed on an open end thereof;
    forming a shank portion on a closed end of said saw cup; and
    retaining a shank of a spade bit in said shank portion, at least one substantially horizontal cutting surface being formed on a base portion of said spade bit, said at least one substantially horizontal cutting surface being substantially parallel to said cutting surface formed on said saw cup, said at least one substantially horizontal cutting surface extending out-of said saw cup and past said cutting surface, a portion of said base portion extending into said saw cup.

8. The method of providing efficient slug removal from a hole saw of claim 7, further comprising the step of:
    providing a plurality of cutting teeth for said cutting surface.

9. The method of providing efficient slug removal from a hole saw of claim 7, further comprising the step of:
    threading a fastener into said shank portion to retain said spade bit.

10. The method of providing efficient slug removal from a hole saw of claim 7, further comprising the step of:
    inserting said shank into a contact disc and a compression spring before inserting said shank into said shank portion.

11. The method of providing efficient slug removal from a hole saw of claim 7, further comprising the step of:
    providing said spade bit with a vertical tapered cutting projection extending from said base portion.

12. The method of providing efficient slug removal from a hole saw of claim 7, further comprising the step of:
    providing said spade bit with a base portion, forming a negative tapered surface on opposing sides of said base portion.

13. A method of providing efficient slug removal from a hole saw comprising the steps of:
    providing a saw cup having a cutting surface formed on an open end thereof;
    forming a shank portion on a closed end of said saw cup; and
    retaining a shank of a spade bit in said shank portion, at least one substantially horizontal cutting surface being formed on a base portion of said spade bit, said at least one substantially horizontal cutting surface extending out-of said saw cup and past said cutting surface, a portion of said base portion extending into said saw cup.

14. The method of providing efficient slug removal from a hole saw of claim 13, further comprising the step of:
    providing a plurality of cutting teeth for said cutting surface.

15. The method of providing efficient slug removal from a hole saw of claim 13, further comprising the step of:
    threading a fastener into said shank portion to retain said spade bit.

16. The method of providing efficient slug removal from a hole saw of claim 13, further comprising the step of:
    inserting said shank into a contact disc and a compression spring before inserting said shank into said shank portion.

17. The method of providing efficient slug removal from a hole saw of claim 13, further comprising the step of:
    providing said spade bit with a vertical tapered cutting projection extending from said base portion.

18. The method of providing efficient slug removal from a hole saw of claim 13, further comprising the step of:
    providing said spade bit with a base portion, forming a negative tapered surface on opposing sides of said base portion.

* * * * *